United States Patent
Wang et al.

(10) Patent No.: US 11,436,749 B2
(45) Date of Patent: Sep. 6, 2022

(54) DETERMINING THE LOCATION OF A MOBILE DEVICE

(71) Applicant: OXFORD UNIVERSITY INNOVATION LIMITED, Oxford (GB)

(72) Inventors: Sen Wang, Beijing (CN); Ronald Clark, Sandton (ZA); Agathoniki Trigoni, Oxford (GB)

(73) Assignee: OXFORD UNIVERSITY INNOVATION LIMITED, Oxford (GB)

( * ) Notice: Subject to any disclaimer, the term of this patent is extended or adjusted under 35 U.S.C. 154(b) by 0 days.

(21) Appl. No.: 16/479,868

(22) PCT Filed: Jan. 17, 2018

(86) PCT No.: PCT/GB2018/050134
§ 371 (c)(1),
(2) Date: Jul. 22, 2019

(87) PCT Pub. No.: WO2018/134589
PCT Pub. Date: Jul. 26, 2018

(65) Prior Publication Data
US 2021/0350563 A1    Nov. 11, 2021

(30) Foreign Application Priority Data

Jan. 23, 2017 (GR) ............................... 20170100024
Feb. 24, 2017 (GB) ...................................... 1703005

(51) Int. Cl.
*G06K 9/00* (2022.01)
*G06T 7/70* (2017.01)
(Continued)

(52) U.S. Cl.
CPC ............. *G06T 7/70* (2017.01); *G06N 3/0445* (2013.01); *G06N 3/0454* (2013.01); *G06N 3/084* (2013.01);
(Continued)

(58) Field of Classification Search
CPC ................ G06N 3/0454; G06N 3/0445; G06T 2207/20084
See application file for complete search history.

(56) References Cited

U.S. PATENT DOCUMENTS 6,704,621 B1    3/2004    Stein et al.
7,925,049 B2    4/2011    Zhu et al.
(Continued)

FOREIGN PATENT DOCUMENTS

CN    103983263 A    8/2014
CN    106017458 A    10/2016
(Continued)

OTHER PUBLICATIONS

Tsironi, Eleni, Pablo VA Barros, and Stefan Wermter. "Gesture Recognition with a Convolutional Long Short-Term Memory Recurrent Neural Network." ESANN. 2016. (Year: 2016).*
(Continued)

*Primary Examiner* — Hadi Akhavannik
(74) *Attorney, Agent, or Firm* — Lathrop GPM LLP

(57) ABSTRACT

A computer-implemented method of determining the location of a mobile device comprising a camera. The method comprises the steps of capturing, using the camera, a sequence of images over a period of time; for pairs of consecutive images from the sequence of images, determining, using a first neural network, features indicative of the motion of the device between the time the first image of the pair of images was captured and the time the second image of the pair of images was captured; for a sequence of
(Continued)

consecutive images, determining, using a second neural network, features indicative of the location of the device from the features determined by the first neural network; and for a sequence of consecutive images, determining the location of the device from the features determined by the second neural network.

13 Claims, 4 Drawing Sheets

(51) Int. Cl.
   *G06N 3/04* (2006.01)
   *G06N 3/08* (2006.01)
   *G06T 7/20* (2017.01)

(52) U.S. Cl.
   CPC ...... *G06T 7/20* (2013.01); *G06T 2207/10016* (2013.01); *G06T 2207/20081* (2013.01); *G06T 2207/20084* (2013.01); *G06T 2207/30244* (2013.01); *G06T 2207/30248* (2013.01)

(56) References Cited

U.S. PATENT DOCUMENTS

| | | | |
|---|---|---|---|
| 8,213,706 | B2 | 6/2012 | Krishnaswamy et al. |
| 8,259,994 | B1 | 9/2012 | Anguelov et al. |
| 8,761,439 | B1 | 6/2014 | Kumar et al. |
| 9,148,650 | B2 | 9/2015 | Chandraker et al. |
| 9,243,915 | B2 | 1/2016 | Hernandez et al. |
| 9,390,344 | B2 | 7/2016 | Pirchheim et al. |
| 2008/0195316 | A1 | 8/2008 | Krishnaswamy |
| 2009/0248304 | A1 | 10/2009 | Roumeliotis et al. |
| 2014/0320593 | A1 | 10/2014 | Pirchheim et al. |
| 2014/0341465 | A1 | 11/2014 | Li et al. |
| 2015/0201180 | A1 | 7/2015 | Mourikis et al. |
| 2016/0187199 | A1* | 6/2016 | Brunk .................. G06K 9/4661 348/89 |
| 2016/0305784 | A1 | 10/2016 | Roumeliotis et al. |
| 2016/0325753 | A1 | 11/2016 | Stein et al. |
| 2017/0124432 | A1* | 5/2017 | Chen ..................... G06F 40/30 |
| 2018/0336424 | A1* | 11/2018 | Jang ........................ G06T 7/20 |
| 2019/0180144 | A1* | 6/2019 | Tsishkou ............ G06K 9/00805 |

FOREIGN PATENT DOCUMENTS

| | | |
|---|---|---|
| EP | 0848231 A1 | 6/1998 |
| EP | 2854104 A1 | 4/2015 |
| EP | 3182373 A1 | 6/2017 |
| JP | 10170299 A | 6/1998 |
| JP | 11110542 A | 4/1999 |
| WO | WO 2006084385 A1 | 8/2006 |
| WO | WO 2014070483 A1 | 5/2014 |
| WO | WO 2014130854 A1 | 8/2014 |
| WO | WO 2015013418 A2 | 1/2015 |
| WO | WO 2015013534 A1 | 1/2015 |
| WO | WO 2015190269 A2 | 12/2015 |
| WO | WO 2016187757 A1 | 12/2016 |

OTHER PUBLICATIONS

United Kingdom Patent Application No. 1703005.7, Search Report dated Aug. 23, 2017, 3 pages.
PCT/GB2018/050134 International Search Report and Written Opinion dated Apr. 19, 2018, 12 pp.
United Kingdom Patent Application No. 1703006.5, Search Report dated Aug. 23, 2017, 3 pages.
PCT/GB2018/050132 International Search Report and Written Opinion dated Apr. 18, 2018, 9 pp.
Mohanty et al. (2016) "DeepVO: A Deep Learning approach for Monocular Visual Odometry," arxiv.org, Cornell University Library, 201 Olin Library Cornell University Ithaca, NY 14853., 9 pp.
Technische Universitat Munchen et al. (2018) "Department of Informatics Deep Learning for Image-Based Localization," 77 pp. [Retrieved from the Internet: https://vision.in.tum.de/_media/members/hazirbas/teaching/walch2016msc.pdf].
Walch et al. (2016) "Image-based Localization with Spatial LSTMs,", 10 pp. [Retrieved from the Internet: https://pdfs.semanticscholar.org/f6dd/8c7e8d38b7a315417fbe57d20111d7b84a16.].
Liu et al. (2106) "Joint Customer Pose and Orientation Estimation Using Deep Neural Network from Surveillance Camera," 2016 IEEE International Symposium on Multimedia (ISM), IEEE, pp. 216-221.
Rambach et al. (2016) "Learning to Fuse: A Deep Learning Approach to Visual-Inertial Camera Pose Estimation," 2016 IEEE International Symposium on Mixed and Augmented Reality (ISMAR), IEEE, 6 pp.
Jaegle et al. (2106) "Unsupervised learning of image motion by recomposing sequences," arxiv.org, Cornell University Library, 201 Olin Library Cornell University Ithaca, NY 14853, 15 pp.
Wu et al. (2016) "Deep Learning for Video Classification and Captioning," arxiv.org, Cornell University Library, 201 Olin Library Cornell University Ithaca, NY 14853, 114 pp.
Nister et al. (2004) "Visual odometry," 2004 IEEE Computer Society Conf on Computer Vision and Pattern Recognition, vol. 1, pp. 652-659.
Kneip et al. (2011) "Robust Real-Time Visual Odometry with a Single Camera and an IMU," [Retriever from the Internet: http://www.margaritachli.com/papers/BMVC2011paper.pdf], 7 pp.
Voigt et al. (2011) "Robust embedded egomotion estimation" Int Conf on Intelligent Robots and Systems (IROS), 25, pp. 2694-2699.
U.S. Appl. No. 16/479,855, Notice of Allowance dated Feb. 2, 2022, 27 pages.

* cited by examiner

DETERMINING THE LOCATION OF A MOBILE DEVICE

FIELD OF THE INVENTION

The present invention concerns determining the location of a mobile device. More particularly, but not exclusively, the invention concerns using neural networks to determine the location of a mobile device from images captured by a camera of the mobile device.

The invention is particularly, but not exclusively, applicable where the mobile device is an autonomous robot. However, the invention is also applicable to other types of mobile and wearable devices, such as mobile phones, smart watches and the like.

"Location" as discussed herein may refer to absolute location, such as that a mobile device is at a position on the Earth defined by latitude and longitude, and may also refer to relative location with respect to another position (e.g. a mobile device is a distance and direction from an initial starting position). Determination of location also frequently includes determination of orientation, in absolute terms with respect to the Earth's magnetic field for example, and in relative terms as rotation of a certain amount with respect to an initial orientation.

BACKGROUND OF THE INVENTION

It is desirable to be able to determine the location of mobile devices where no GPS signal is available. This is particularly the case for autonomous robots, to allow accurate navigation. A known approach is to use images from a camera in order to determine location. However, such systems tend to require very precise calibration of the camera if location is to be reliably determined. Traditional visual odometry techniques include sparse methods (comprising several steps, including detection and matching of features, motion estimation and optimisation), and direct methods (comprising steps of motion estimation and optimisation). Such techniques tend to require precise camera calibration, and often fail in texture-poor environments (i.e. where there are with few features) or when a camera capturing images is rotated rapidly. In addition, while such systems are usually able to determine the shape of a path of travel, they are usually unable to estimate scale, i.e. the actual distance travelled.

Alternatively, it is known to use a neural network to process the images from a camera in order to determine location. Mohanty et al, DeepVO: A Deep Learning approach for Monocular Visual Odometry, arXiv: 1611.06069, published 18 Nov. 2016, discloses such a system. However, there are various problems with known systems that use neural networks. They tend to require training for the specific environments in which they will be used, so cannot be used in new environments without suitable training occurring first.

The present invention seeks to mitigate the above-mentioned problems. Alternatively and/or additionally, the present invention seeks to provide improved methods of determining the location of a mobile device.

SUMMARY OF THE INVENTION

In accordance with a first aspect of the invention there is provided a computer-implemented method of determining the location of a mobile device comprising a camera, comprising the steps of:

capturing, using the camera, a sequence of images over a period of time;

for pairs of consecutive images from the sequence of images, determining, using a first neural network, features indicative of the motion of the device between the time the first image of the pair of images was captured and the time the second image of the pair of images was captured;

for a sequence of consecutive images, determining, using a second neural network, features indicative of the location of the device from the features determined by the first neural network; and for a sequence of consecutive images, determining the location of the device from the features determined by the second neural network.

By using a combination of two neural networks, it has been found that much more robust and reliable location determination is possible. In particular, the first neural network can be trained to most effectively determine features from the images that are indicative of the motion suggested by the differences between the images, which depends only on the two images and is not dependent upon historical information such as previously determined locations. However, the second neural network can at the same time be trained to most effectively determine the location of the mobile device from the features determined by the first neural network, for which historical information such as previously determined locations is extremely useful. By splitting the processing across two neural networks in this way, training for both step-wise motion and overall location can be effectively achieved. Further, both neural networks can be trained simultaneously by training the system as a whole, and so in particular the first neural network can be trained to determine whatever motion features are best for the operation of the system as a whole, rather than being trained to determine motion features with pre-selected attributes which may not in fact be the optimal type of features to use.

Preferably, the orientation of the device is determined in addition to the location of the device. Thus, the "pose" of the device is determined.

Preferably, the images of the sequence of images are monocular images.

Advantageously, the first neural network is a convolutional neural network. This type of neural network is particularly suited for operating upon data with a large number of parameters such as image data.

Advantageously, the second neural network is a recurrent neural network. In this case, preferably the second neural network is a Long Short-Term Memory neural network. Recurrent neural networks, in particular of Long Short-Term Memory type, are particular suitable for operating upon time-dependent data.

Preferably, the method further comprises the step of determining, from the features determined by the second neural network, relative location and orientation information for the device for each pair of consecutive captured images. In this case, preferably the step of determining the location of the device comprises composing the relative location and orientation information determined from the features determined by the second neural network. In other words, the location of the device is determined odometrically from successive motion estimations.

Advantageously, the method further comprising the step of determining corresponding uncertainty information for the relative location and orientation information for each pair of consecutive captured images. The uncertainty information can be used along with pose information as input to simultaneous localisation and mapping (SLAM) algorithms.

Each image of the sequence of images may have associated with its corresponding location information, and the method may further comprise the step of training the first and second neural networks using the corresponding location information. Preferably, each image also has associated with it orientation information.

The device may be an autonomous robot. The device may alternatively be a mobile telephone, wearable device or any other suitable mobile device.

In accordance with a second aspect of the invention there is provided a mobile device comprising:
memory;
a processor;
a camera;
wherein the device is arranged to:
capture, using the camera, a sequence of images over a period of time;
for pairs of consecutive images from the sequence of images, determine, using a first neural network provided by the processor, features indicative of the motion of the device between the time the first image of the pair of images was captured and the time the second image of the pair of images was captured;
for a sequence of consecutive images, determine, using a second neural network provided by the processor, features indicative of the location from the features determined by the first neural network; and for a sequence of consecutive images, determine the location of the device from the features determined by the second neural network.

Preferably, the device is arranged to determine the orientation of the device in addition to the location of the device.

Preferably, the images of the sequence of images are monocular images.

Advantageously, the first neural network is a convolutional neural network.

Advantageously, the second neural network is a recurrent neural network. In this case, preferably the second neural network is a Long Short-Term Memory neural network.

Preferably, the device is further arranged to determine, from the features determined by the second neural network, relative location and orientation information for the device for each pair of consecutive captured images. In this case, preferably the device is arranged to determine the location of the device by composing the relative location and orientation information determined from the features determined by the second neural network.

Advantageously, the device is further arranged to determine corresponding uncertainty information for the relative location and orientation information for each pair of consecutive captured images.

In accordance with a third aspect of the invention there is provided a computer program product arranged, when executed on a mobile device, to perform any of the methods described above.

In accordance with a fourth aspect of the invention there is provided a computer program product arranged, when executed on a mobile device, to provide any of the mobile devices described above.

It will of course be appreciated that features described in relation to one aspect of the present invention may be incorporated into other aspects of the present invention. For example, the method of the invention may incorporate any of the features described with reference to the mobile device of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
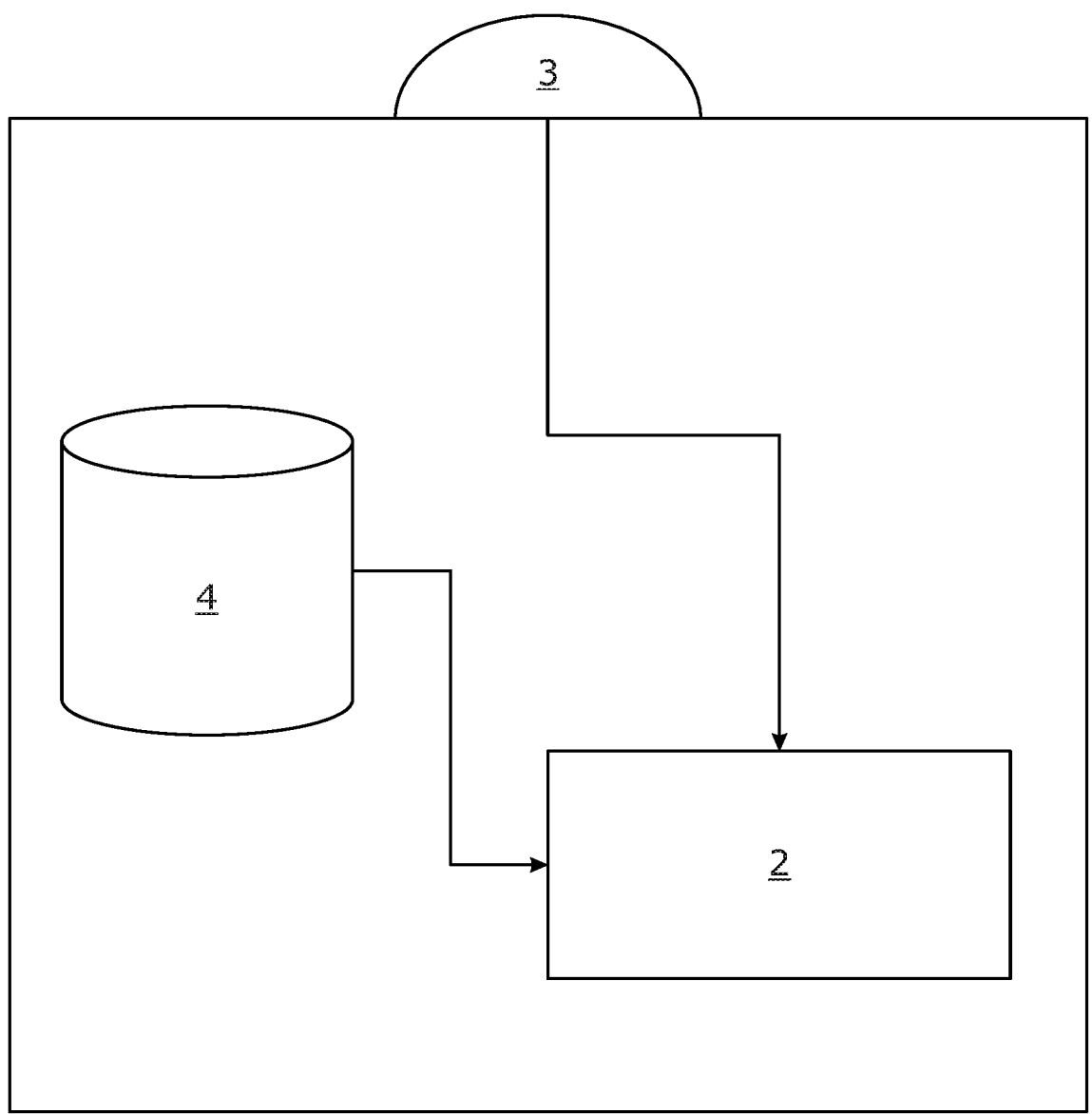
FIG. 1 is a schematic diagram of an autonomous robot in accordance with an embodiment of the invention.

A schematic diagram of an autonomous robot in accordance with an embodiment of the invention is shown in FIG. 1. The autonomous robot 1 comprises a processor 2. It will be appreciated that in different embodiments the processor 2 may be a single processor system, a dual processor system, or any other suitable processor system. The processor 2 is in communication with a camera 3, and a memory 4 which stores (amongst other things) images captured by the camera 3.

Figure 2:
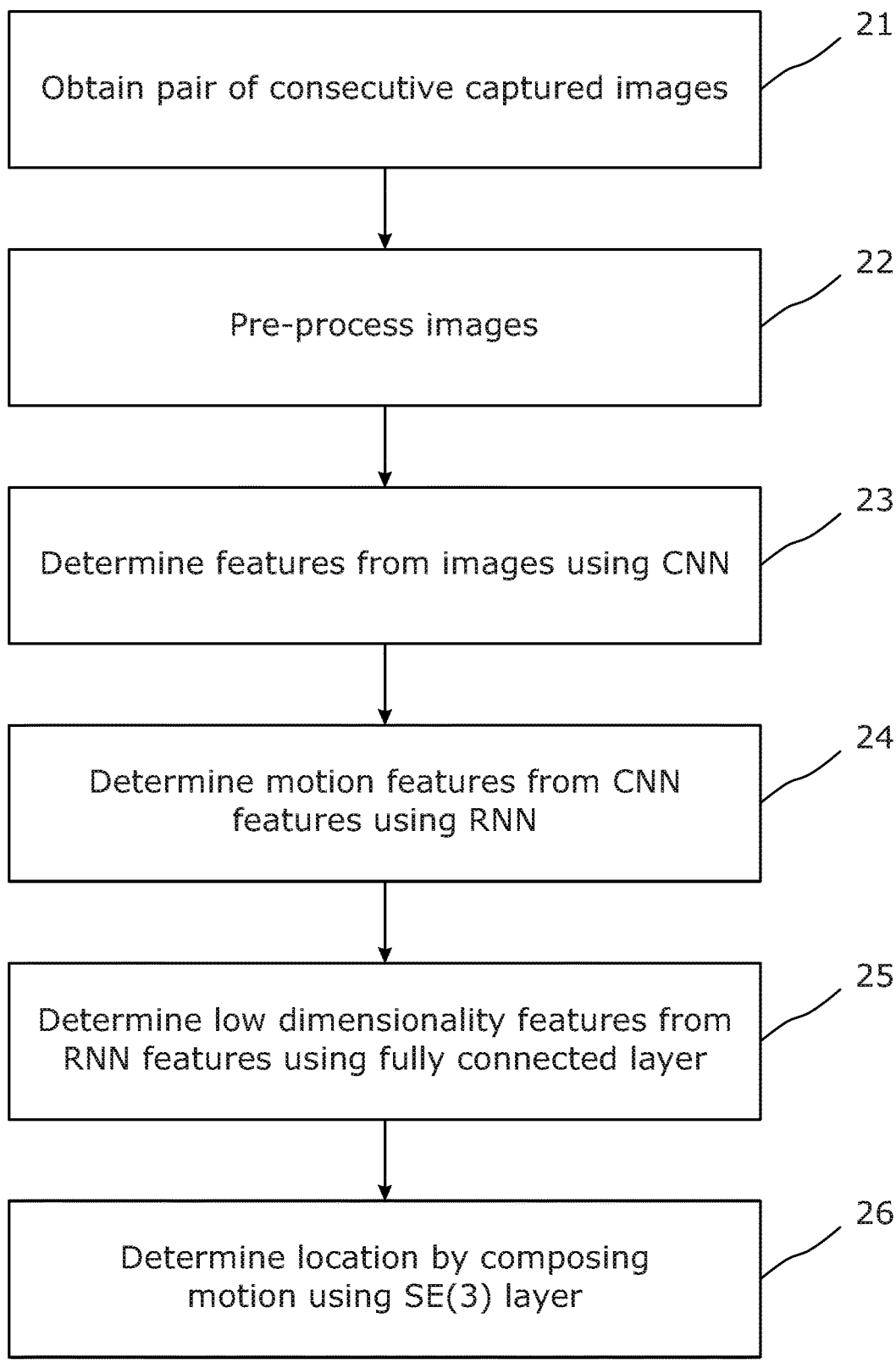
FIG. 2 is a flowchart showing operation of the autonomous robot of FIG. 1 to estimate its location.
Figure 3:
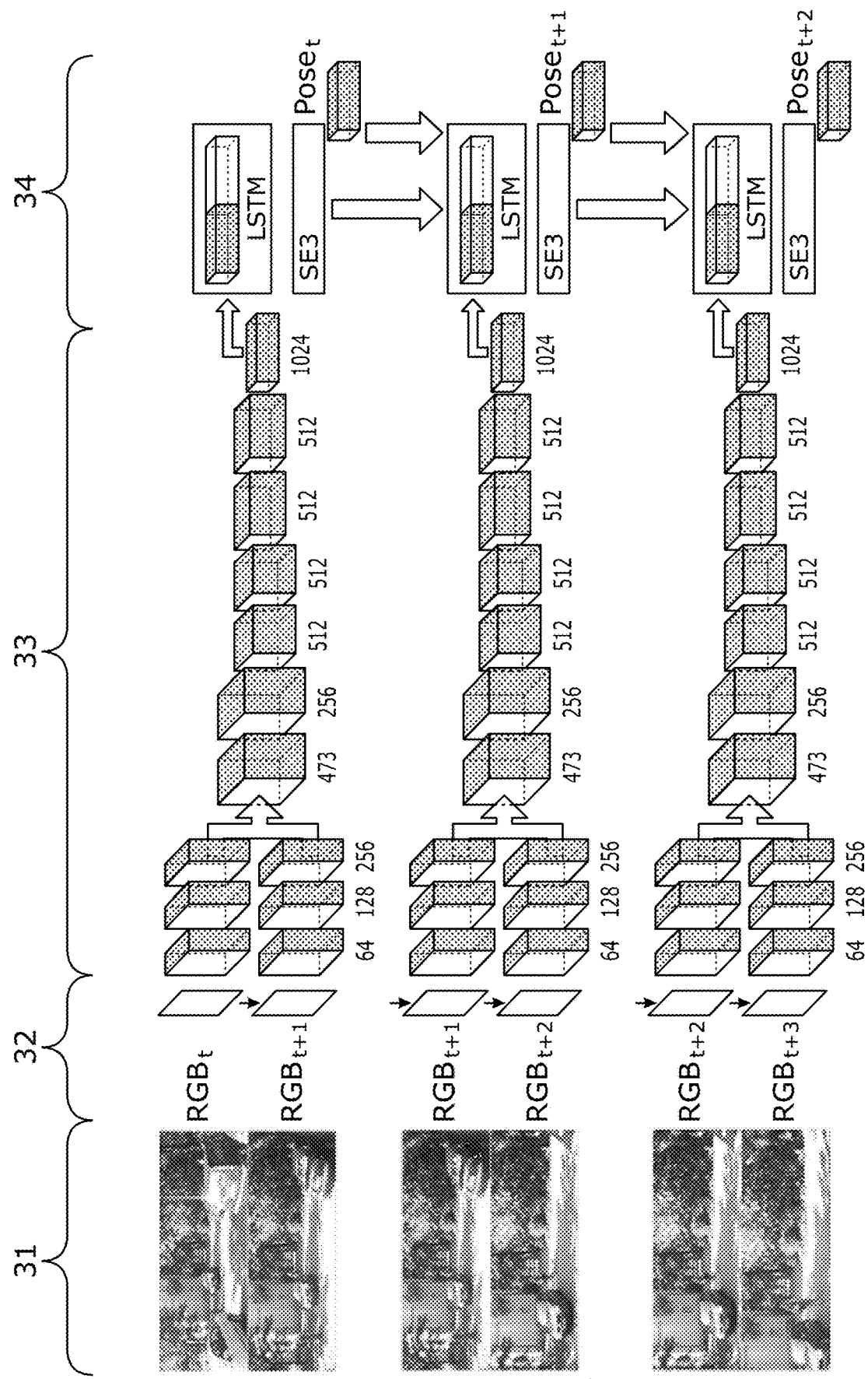
FIG. 3 is a schematic diagram representing the process of FIG. 2.

The operation of the autonomous robot 1 to determine its location is now described with reference to the flowchart of FIG. 2. The process is also shown schematically in FIG. 3. At each time step the autonomous robot 1 determines its location based on the information currently available to it. FIG. 3 shows three successive time steps t, t+1 and t+2, where for each time step a "pose" for the autonomous robot 1 is determined, $Pose_t$, $Pose_{t+1}$ and $Pose_{t+2}$ respectively, where a pose is a combination of location and heading information (i.e. the direction in which the autonomous robot is facing).

First, a pair of images consecutive captured by the camera 3 are obtained (step 21, portion 31 of FIG. 3). Each image is then pre-processed (step 22, portion 32 of FIG. 3), by subtracting the mean RGB channel values from an example set of images. The set of images may be those with which the autonomous robot 1 is trained, for example, as described in detail below. In addition, the images are resized to be a multiple of 64. However, such pre-processing is optional, and in other embodiments does not occur. As can be seen in FIG. 3, for time step t the initial pair of images results in pre-processed images $RGB_t$ and $RGB_{t+1}$, while for time step t+1 the pre-processed images are $RGB_{t+1}$ and $RGB_{t+2}$, and so on for the other time steps.

A convolutional neural network (CNN), implemented by the processor 2 and memory 4, takes the pair of pre-processed images and uses it to determine features (step 23, portion 33 of FIG. 3). The CNN determines the features in accordance with its training, which has been performed as described below.

CNNs are a type of neural network that incorporates convolutional layers in the network structure and so, in contrast to fully-connected layers used in other types of neural network, are able to take advantage of the spatial regularity of data. This means that the number of parameters required for the CNN is significantly reduced, allowing them to operate on high-dimensional input (such as raw image data). In CNNs, multiple convolutional operations are applied at each convolutional layer, to determine a number of features from the output map of the previous layer. The filter kernels with which the maps are convolved are learned during training, as described for example in [38].

The CNN takes as input a tensor generated by stacking the pair of pre-processed consecutive images. The CNN is composed of nine convolutional layers, each except the last followed by a Rectified Linear Unit (ReLU) non-linearity activation, giving 17 layers in total. The layers are configured as follows:

| Layer | Receptive field size | Padding | Stride | Number of channels |
|---|---|---|---|---|
| Conv1 | 7 × 7 | 3 | 2 | 64 |
| Conv2 | 5 × 5 | 2 | 2 | 128 |
| Conv3 | 5 × 5 | 2 | 2 | 256 |
| Conv3_1 | 3 × 3 | 1 | 1 | 256 |
| Conv4 | 3 × 3 | 1 | 2 | 512 |
| Conv4_1 | 3 × 3 | 1 | 1 | 512 |
| Conv5 | 3 × 3 | 1 | 2 | 512 |
| Conv5_1 | 3 × 3 | 1 | 1 | 512 |
| Conv6 | 3 × 3 | 1 | 2 | 1024 |

The sizes of the receptive fields in the network gradually reduce from 7×7 to 5×5 and then 3×3, to capture small interesting features. Zero-paddings are introduced either to adapt to the configurations of the receptive fields, or to preserve the spatial dimension of the tensor after convolution. The number of the channels, i.e. the number of filters for feature detection, increases to learn various features.

In the present embodiment the CNN has 55 million trainable weighs, but it will be appreciated that in other embodiments different numbers of weights could be used.

The features from the final layer (i.e. Conv6) are then the output of the CNN.

Next, a recurrent neural network (RNN) takes the features generates by the CNN, and determines motion features from them (step 24, LSTM box of portion 34 of FIG. 3). Similarly to the CNN, the RNN does this in accordance with its training, which is described in detail below.

RNNs are a type of neural network in which the layers operate on the input, but also on delayed versions of the hidden layers and/or output. In this way, RNNs have an internal state that they can use as "memory" to keep track of past inputs and corresponding decisions.

Figure 4:
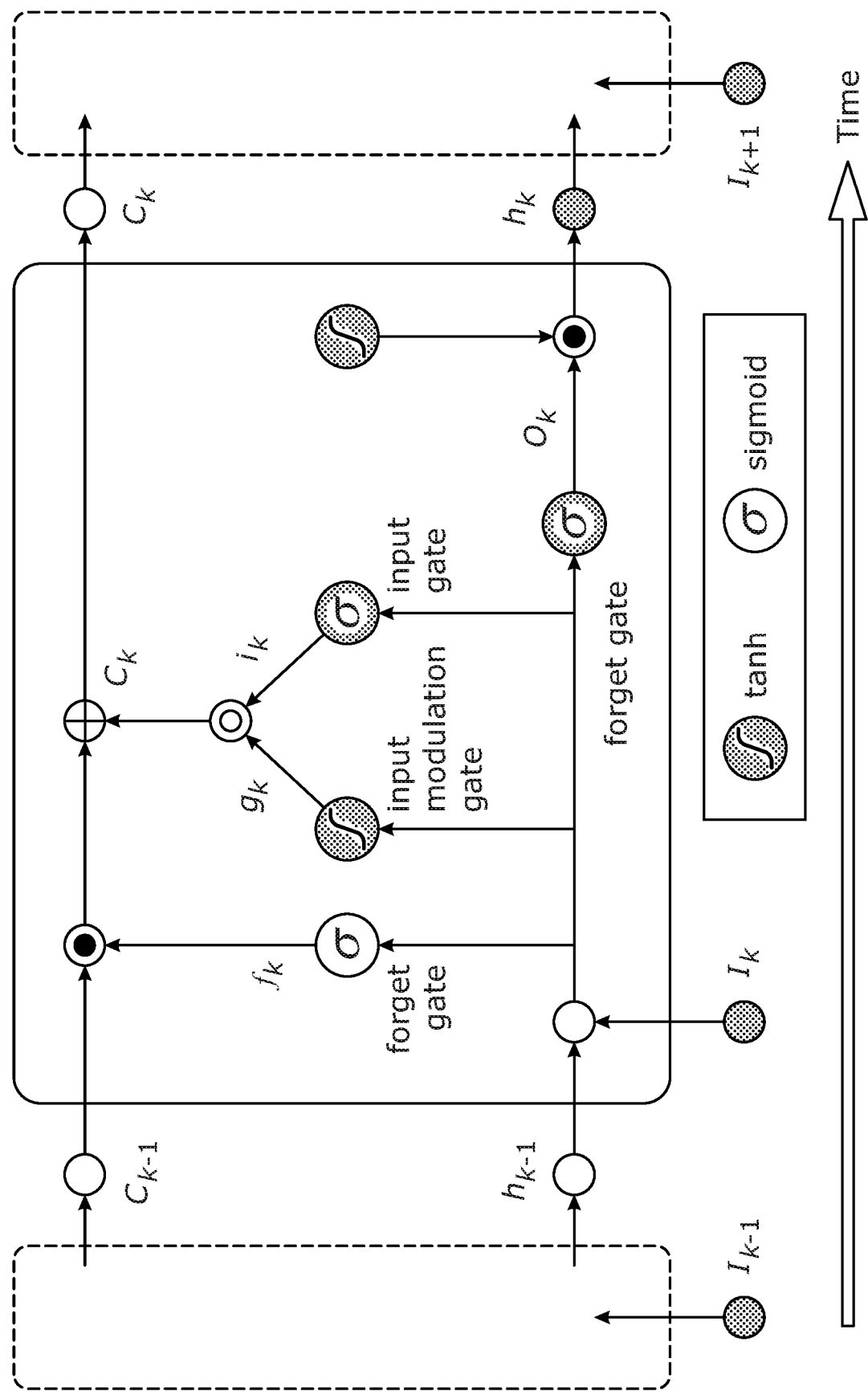
FIG. 4 is a schematic diagram of an LSTM used in the process of FIGS. 2 and 3.

In the present embodiment, an RNN with a Long Short-Term Memory (LTSM) architecture is used (of which various variations exist), as shown in FIG. 4, in which ⊙ denotes element-wise product, and ⊕ denotes addition of two vectors. The contents of the memory cell is stored in $c_t$. The input gate it controls how the input enters into the contents of the memory for the current time-step. The forget gate $f_t$ determines when the memory cell should be emptied by producing a control signal 0 to 1 which clears the memory cell as needed. Finally, the output gate $o_t$ determines whether the contents of the memory cell should be used at the current time step.

The operation of the RNN is described by the following equations:

$$i_t = \sigma(W_{xi}x_t + W_{hi}h_{t-1} + W_{ci}c_{t-1} + b_i)$$

$$f_t = \sigma(W_{xf}x_t + W_{hf}h_{t-1} + W_{cf}c_{t-1} + b_f)$$

$$z_t = \tanh(W_{xc}x_t + W_{hc}h_{t-1} + b_c)$$

$$c_t = f_t \odot c_{t-1} + i_t \odot z_t$$

$$o_t = act(w_{xo}x_t + W_{ho}h_{t-1} + W_{co}c_t + b_0)$$

$$h_t = o_t \odot \tanh(c_t)$$

The parameters $W_{i,j}$ and $b_i$ fully parameterise the operation of the RNN, and are learned during training. The recurrent hidden layer allows the network to make use of the temporal regularity of the input data to improve its performance.

While in traditional LSTM models only the hidden state is carried over from the previous time step, in the present embodiment the pose determined for the previous time step is directly fed to the RNN as input. This can be seen in FIG. 3, in which the pose for a time step is fed to the LSTM box for the next time step. The reason for doing this is because, for location estimation, the output is essentially the integration of successive displacements at each time step. Consequently, the determined pose for the previous time step is of particular significance.

In the present embodiment the LSTM has two layers with cells of 2000 units, but it will be appreciated that in other embodiments different numbers of layers and units could be used.

Next, the motion features determined by the RNN (of high dimensionality) are passed to a fully connected layer (step 25), which outputs features of low dimensionality (at least 6 for pose, 6 for uncertainty, and potentially more for each if a mixture of Gaussians is used to estimate pose and uncertainty).

Next, the low dimensional features from the fully connected layer are passed to an SE(3) layer (step 26, SE3 box of portion 34 of FIG. 3). The SE(3) composes successive motion features for each time step, in order to at each time step determine a location (in fact a pose, such as Pose$_t$ for time step t) for the autonomous robot 1.

SE3 is the special Euclidian group whose elements are transformational matrices, which consist of a rotation from the special orthogonal group SO3 and a translation vector:

$$T = \left\{ \begin{pmatrix} R & T \\ 0 & 1 \end{pmatrix} \middle| R \in SO(3), T \in \mathcal{R}^3 \right\}.$$

Producing transformation estimates belonging to SE3 is not straightforward, as the SO3 component needs to be an orthogonal matrix. However, the Lie Algebra se3 of SE3 can be described by components which are not subject to orthogonality constraints:

$$\frac{\xi}{dt} = \left\{ \begin{pmatrix} [\omega]_\times & v \\ 0 & 0 \end{pmatrix} \middle| v \in so(3), v \in \mathcal{R}^3 \right\},$$

Conversion between se3 and SE3 can then be accomplished using the exponential map:

exp: $se3 \rightarrow SE3$

In an alternative embodiment, quaternionic representations of rotations are used instead of the matrix representations. In particular, the ω components are converted to vector:

$$w_t = [0, \omega_x, \omega_y, \omega_z]$$

$$\dot{q}_t = \tfrac{1}{2} w_t \times q_k$$

$$q_t = q_t + dt\dot{q}_t$$

Calculating the gradients of these quantities can then be done using only simple linear algebra operations. In addition, the expensive eigenvalue decompensation required to calculate the exponential map is avoided.

Thus, in this way the autonomous robot 1 uses the images from the camera 3 to estimate its location, in particular its pose.

Estimating location from successive sensor measurements (i.e. odometry) is inevitably subject to drift. As a result, it is common to use it in tandem with loop-closure, map-matching or pose-graph optimisation methods to create Simultaneous Localisation and Mapping (SLAM) systems. A key aspect of integrating odometry measurements into such systems is the availability of uncertainty estimates.

In order to provide such estimates, the output of the fully connected layer is used (before the SE(3) layer). Estimates produced by the fully connected layer are compared with ground truth pose information from training data, resulting in a distribution of errors in pose (location and orientation). A max likelihood approach is then used to train the prediction of the mixture of Gaussian distributions that represents the uncertainty.

In order to operate, neural networks of course need to be trained, which is done by providing test data and a cost function to be minimised. The training of the CNN and RNN of the autonomous robot 1 as now described; in fact, both are trained simultaneously.

As discussed above, the system of the present embodiment estimates both pose and uncertainty. The test data will be a sequence of images, with "ground truth" poses (i.e. correct poses) for those images. The cost function for training is composed of two parts, the first part relating to the pose estimate and the second part relating to the uncertainty estimate. For pose estimation, the first part of the cost function trains the system to minimise the difference between the estimated poses and the ground truth poses. For uncertainty estimation, the second part of the cost function trains the system by comparing the output of the neural network with pose labels. The training is then done by back-propagation through time, to adjust the weights of the CNN and RNN to best minimise the result of the cost function.

In this way, it can be seen that the CNN is trained to provide the most appropriate features for input to the RNN, and the RNN is simultaneously trained to most accurately determine the pose (and uncertainty thereof) of the autonomous robot 1 from those features (and previous determinations). The CNN in particular is not trained to best provide features of any particular type or with any specific properties; rather it is simply trained to provide features which are best for the operation of the system as a whole. However, in certain embodiments, to speed up the initial training process, the CNN is initially trained in isolation (or otherwise provided with weights that have the effect of such training) to provide features indicative of movement between successive images. This provides an initial state for the CNN, which is then further optimally trained as the system is trained as a whole.

While the present invention has been described and illustrated with reference to particular embodiments, it will be appreciated by those of ordinary skill in the art that the invention lends itself to many different variations not specifically illustrated herein.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A computer-implemented method of determining the location of a mobile device comprising a camera, comprising the steps of:
   capturing, using the camera, a sequence of images over a period of time;
   for pairs of consecutive images from the sequence of images, determining, using a convolutional neural network, features indicative of the motion of the device between the time the first image of the pair of images was captured and the time the second image of the pair of images was captured;
   for the sequence of consecutive images, determining, using a recurrent neural network, features indicative of the location of the device from the features determined by the convolutional neural network;
   for a sequence of consecutive images, determining the location of the device from the features determined by the recurrent neural network;
   determining, from the features determined by the recurrent neural network, relative location and orientation information for the device for each pair of consecutive captured images; and
   determining corresponding uncertainty information for the relative location and orientation information for each pair of consecutive captured images.

2. A method as claimed in claim 1, wherein the orientation of the device is determined in addition to the location of the device.

3. A method as claimed in claim 1, wherein the images of the sequence of images are monocular images.

4. A method as claimed in claim 1, wherein the recurrent neural network is a Long Short-Term Memory neural network.

5. A method as claimed in claim 1, wherein the step of determining the location of the device comprises composing the relative location and orientation information determined from the features determined by the recurrent neural network.

6. A method as claimed in claim 1, wherein each image of the sequence of images has associated with it corresponding location and orientation information, and wherein the method further comprises the step of training the convolutional and recurrent neural networks using the corresponding location and orientation information.

7. A method as claimed in claim 1, wherein the device is an autonomous robot.

8. A mobile device comprising:
   memory;
   a processor;
   a camera;
   wherein the device is arranged to:
   capture, using the camera, a sequence of images over a period of time;
   for pairs of consecutive images from the sequence of images, determine, using a convolutional neural network provided by the processor, features indicative of the motion of the device between the time the first image of the pair of images was captured and the time the second image of the pair of images was captured;

for the sequence of consecutive images, determine, using a recurrent neural network provided by the processor, features indicative of the location of the device from the features determined by the convolutional neural network;

for a sequence of consecutive images, determine the location of the device from the features determined by the recurrent neural network;

determine, from the features determined by the recurrent neural network, relative location and orientation information for the device for each pair of consecutive captured images; and determine corresponding uncertainty information for the relative location and orientation information for each pair of consecutive captured images.

9. A device as claimed in claim 8, wherein the device is arranged to determine the orientation of the device in addition to the location of the device.

10. A device as claimed in claim 8, wherein the images of the sequence of images are monocular images.

11. A device as claimed in claim 8, wherein the second neural network is a Long Short-Term Memory neural network.

12. A device as claimed in claim 8, arranged to determine the location of the device by composing the relative location and orientation information determined from the features determined by the recurrent neural network.

13. A non-transitory computer-readable medium comprising computer-executable instructions that, when executed by a processor of a mobile device comprising a camera, cause the computing device to perform a method of determining the location of a mobile device, the method comprising:

capturing, using the camera, a sequence of images over a period of time;

for pairs of consecutive images from the sequence of images, determining, using a convolutional neural network, features indicative of the motion of the device between the time the first image of the pair of images was captured and the time the second image of the pair of images was captured;

for the sequence of consecutive images, determining, using a recurrent neural network, features indicative of the location of the device from the features determined by the convolutional neural network;

for a sequence of consecutive images, determining the location of the device from the features determined by the recurrent neural network;

determining, from the features determined by the recurrent neural network, relative location and orientation information for the device for each pair of consecutive captured images; and determining corresponding uncertainty information for the relative location and orientation information for each pair of consecutive captured images.

\* \* \* \* \*